(12) United States Patent
Takahashi

(10) Patent No.: US 9,263,906 B2
(45) Date of Patent: Feb. 16, 2016

(54) CONTROL APPARATUS AND CONTROL METHOD FOR LITHIUM-ION SECONDARY BATTERY

(75) Inventor: Kenji Takahashi, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 136 days.

(21) Appl. No.: 14/352,970

(22) PCT Filed: Oct. 20, 2011

(86) PCT No.: PCT/JP2011/005882
§ 371 (c)(1),
(2), (4) Date: Apr. 18, 2014

(87) PCT Pub. No.: WO2013/057765
PCT Pub. Date: Apr. 25, 2013

(65) Prior Publication Data
US 2014/0239915 A1 Aug. 28, 2014

(51) Int. Cl.
| | | |
|---|---|---|
| *H02J 7/00* | (2006.01) | |
| *H01M 10/44* | (2006.01) | |
| *H01M 10/48* | (2006.01) | |
| *H01M 10/052* | (2010.01) | |
| *H01M 10/0525* | (2010.01) | |

(52) U.S. Cl.
CPC ........... *H02J 7/0052* (2013.01); *H01M 10/052* (2013.01); *H01M 10/44* (2013.01); *H01M 10/486* (2013.01); *H01M 10/0525* (2013.01)

(58) Field of Classification Search
CPC ............ H01M 10/44; H01M 10/0525; H01M 10/486; H01M 10/052; H02J 7/0052
See application file for complete search history.

(56) References Cited

U.S. PATENT DOCUMENTS

| | | | |
|---|---|---|---|
| 5,939,864 A | 8/1999 | Lenhart et al. | |
| 6,075,346 A | 6/2000 | Kikuchi et al. | |
| 6,605,386 B1* | 8/2003 | Kasamatsu | H01M 4/13 429/218.1 |
| 7,642,001 B2* | 1/2010 | Yata | H01M 2/0207 429/50 |
| 8,318,364 B2* | 11/2012 | Matsuda | H01M 8/04231 429/413 |
| 8,704,490 B2* | 4/2014 | Minamiura | H01M 10/44 320/134 |
| 9,083,019 B2* | 7/2015 | Perry | H01M 8/04029 1/1 |
| 2002/0070710 A1 | 6/2002 | Yagi et al. | |
| 2005/0264263 A1 | 12/2005 | Tsenter | |
| 2008/0116852 A1 | 5/2008 | Kuo | |
| 2008/0118833 A1* | 5/2008 | Ueda | H01M 4/131 429/209 |
| 2009/0104523 A1* | 4/2009 | Mullin | C08F 297/02 429/188 |
| 2011/0012562 A1 | 1/2011 | Paryani | |
| 2011/0076557 A1* | 3/2011 | Ishii | B60L 3/0046 429/199 |

(Continued)

FOREIGN PATENT DOCUMENTS

| | | |
|---|---|---|
| JP | 2003-219510 A | 7/2003 |
| JP | 2010-086901 A | 4/2010 |

(Continued)

*Primary Examiner* — Naum B Levin
(74) *Attorney, Agent, or Firm* — Sughrue Mion, PLLC

(57) ABSTRACT

A control apparatus controlling charge and discharge of a lithium-ion secondary battery includes a temperature sensor obtaining the temperature of the lithium-ion secondary battery and a controller. The controller controls the charge and discharge of the lithium-ion secondary battery to maintain the temperature obtained by the temperature sensor at a level lower than an upper limit temperature allowed in the lithium-ion secondary battery. The controller estimates the amount of precipitation of lithium in the lithium-ion secondary battery and reduces the upper limit temperature in accordance with an increase in the amount of precipitation.

16 Claims, 9 Drawing Sheets

(56) References Cited

U.S. PATENT DOCUMENTS

| | | | |
|---|---|---|---|
| 2011/0115441 A1* | 5/2011 | Matsuyama | H01M 10/44 320/150 |
| 2013/0030739 A1 | 1/2013 | Takahashi et al. | |
| 2013/0099794 A1 | 4/2013 | Takahashi et al. | |
| 2013/0149613 A1* | 6/2013 | Yoshikawa | H01G 9/02 429/233 |

FOREIGN PATENT DOCUMENTS

| | | |
|---|---|---|
| JP | 2010-108750 A | 5/2010 |
| JP | 2010-137807 A | 6/2010 |
| JP | 2010-140762 A | 6/2010 |
| JP | 2010-273492 A | 12/2010 |
| JP | 2011-220917 A | 11/2011 |
| WO | 2010/049795 A1 | 5/2010 |
| WO | 2011125213 A1 | 10/2011 |

* cited by examiner

CONTROL APPARATUS AND CONTROL METHOD FOR LITHIUM-ION SECONDARY BATTERY

CROSS REFERENCE TO RELATED APPLICATIONS

This is a National Stage of International Application No. PCT/JP2011/005882 filed Oct. 20, 2011, the contents of which are incorporated herein by reference in its entirety.

TECHNICAL FIELD

The present invention relates to a control apparatus and a control method for controlling charge and discharge of a lithium-ion secondary battery.

BACKGROUND ART

According to a technique described in Patent Document 1, an upper limit electric power to which charge and discharge of a secondary battery are allowed is set in accordance with the temperature of the secondary battery. The charge and discharge of the secondary battery are controlled such that the electric power of the secondary battery does not exceed the upper limit electric power.

PRIOR ART DOCUMENTS

Patent Documents

Patent Document 1: Japanese Patent Laid-Open No. 2003-219510
Patent Document 2: Japanese Patent Laid-Open No. 2010-086901
Patent Document 3: Japanese Patent Laid-Open No. 2010-108750
Patent Document 4: Japanese Patent Laid-Open No. 2010-137807
Patent Document 5: Japanese Patent Laid-Open No. 2010-273492

DISCLOSURE OF THE INVENTION

Problems to be Solved by the Invention

In the technique described in Patent Document 1, when the temperature of the secondary battery is equal to or higher than a predetermined temperature, the upper limit electric power is set at 0 kW so as not to perform the charge and discharge of the secondary battery. The predetermined temperature is a preset fixed value.

A lithium-ion secondary battery has a heatproof temperature changing in accordance with the amount of precipitation of lithium. To protect the lithium-ion secondary battery, it is necessary that the temperature of the lithium-ion secondary battery should fall below the heatproof temperature. Since the predetermined temperature is the fixed value in Patent Document 1, the charge and discharge of the lithium-ion secondary battery may suffer more limitation than necessary.

The heatproof temperature may be higher than the predetermined temperature depending on the amount of the precipitation of lithium. Since more limitation of the charge and discharge of the secondary battery than necessary is not desirable in order to offer the maximum performance of the secondary battery, it is desirable that the predetermined temperature should be appropriately set in view of the heatproof temperature.

Means for Solving the Problems

According to a first aspect, the present invention provides a control apparatus controlling charge and discharge of a lithium-ion secondary battery, including a temperature sensor obtaining the temperature of the lithium-ion secondary battery and a controller. The controller controls the charge and discharge of the lithium-ion secondary battery to maintain the temperature obtained by the temperature sensor at a level lower than an upper limit temperature allowed in the lithium-ion secondary battery. The controller estimates the amount of precipitation of lithium in the lithium-ion secondary battery and reduces the upper limit temperature in accordance with an increase in the amount of precipitation.

According to the first aspect of the present invention, the upper limit temperature can be changed in accordance with the amount of precipitation of lithium. Since the heatproof temperature of the lithium-ion secondary battery is changed in accordance with the amount of precipitation of lithium, the upper limit temperature can be changed with the change in the heatproof temperature. This can achieve the charge and discharge based on the heatproof temperature to offer the performance of the lithium-ion secondary battery easily.

The controller can use information representing the association between the amount of precipitation and the upper limit temperature to specify the upper limit temperature associated with the estimated amount of precipitation. The information representing the association between the amount of precipitation and the upper limit temperature can be stored in a memory.

The controller can set an upper limit electric power based on the upper limit temperature, the charge and discharge of the lithium-ion secondary battery being allowed to the upper limit electric power. The setting of the upper limit electric power corresponding to the upper limit temperature can maintain the temperature of the lithium-ion secondary battery at a level lower than the upper limit temperature. The controller can perform the charge and discharge of the lithium-ion secondary battery with an electric power lower than the upper limit electric power.

According to a second aspect, the present invention provides a control method for controlling charge and discharge of a lithium-ion secondary battery, including obtaining the temperature of the lithium-ion secondary battery, controlling the charge and discharge of the lithium-ion secondary battery to maintain the obtained temperature at a level lower than an upper limit temperature allowed in the lithium-ion secondary battery. The method further includes estimating the amount of precipitation of lithium in the lithium-ion secondary battery and reducing the upper limit temperature in accordance with an increase in the amount of precipitation. The second aspect of the present invention can provide the same advantages as those in the first aspect.

MODE FOR CARRYING OUT THE INVENTION

An embodiment of the present invention will hereinafter be described.

Embodiment 1

Figure 1:
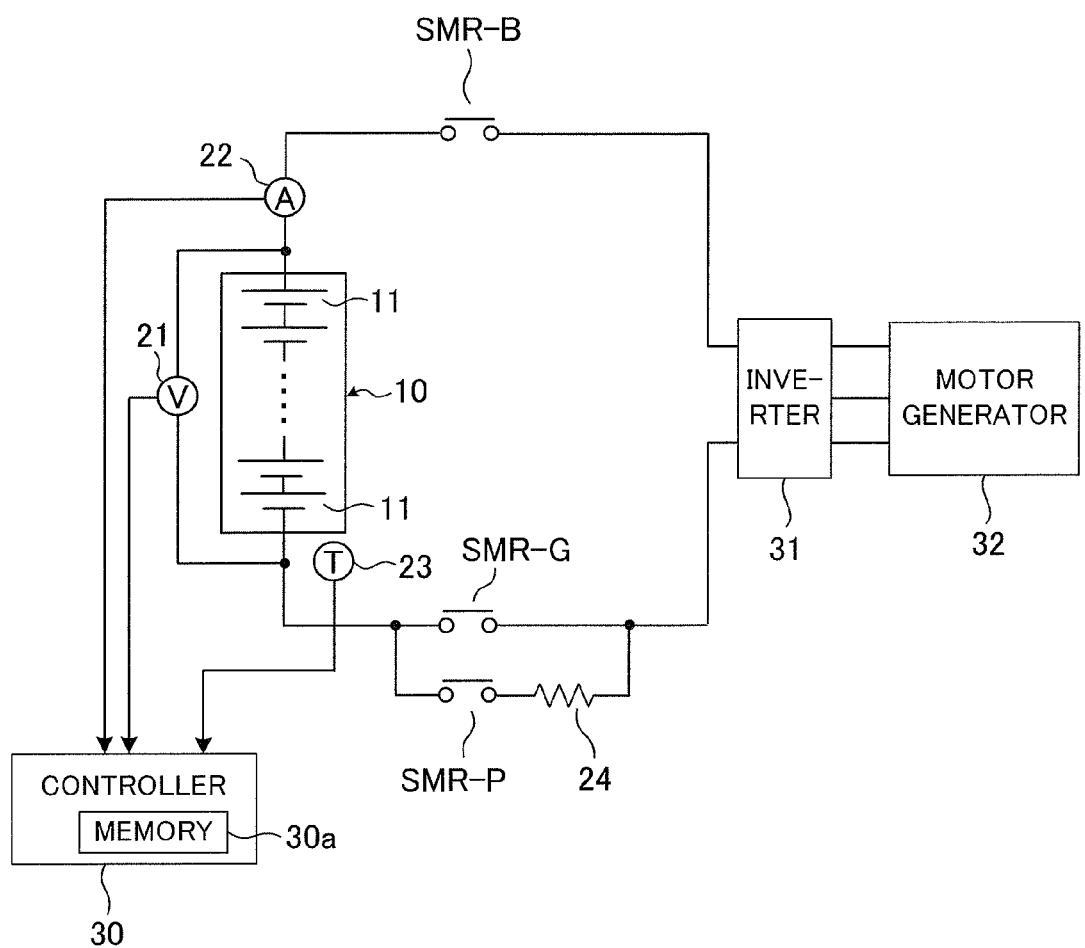
FIG. 1 is a diagram showing the configuration of a battery system.

A battery system which is Embodiment 1 of the present invention is now described with reference to FIG. 1. FIG. 1 is a diagram showing the configuration of the battery system. The battery system of the present embodiment can be mounted on a vehicle.

The battery system of the present embodiment includes an assembled battery 10. The assembled battery 10 includes a plurality of cells 11 connected in series. A lithium-ion secondary battery is used as the cell 11. The number of the cells 11 can be set as appropriate in view of the required output or the like. Although the plurality of cells 11 are connected in series in the present embodiment, the assembled battery 10 may include a plurality of cells 11 connected in parallel.

A voltage sensor 21 detects a voltage between terminals of the assembled battery 10 and outputs the detection result to a controller 30. The voltage sensor can be used to detect the voltage of each of the cells 11 or to detect the voltage of a battery block including at least two of the cells 11. A current sensor 22 detects a current passing through the assembled battery 10 and outputs the detection result to the controller 30.

A temperature sensor 23 detects the temperature of the assembled battery 10 (cell 11) and outputs the detection result to the controller 30. The number of the temperature sensors 23 can be set as appropriate. When a plurality of the temperature sensors 23 are used, the temperature sensors 23 can be placed for the cells 11 located at different positions.

The controller 30 includes a memory 30a. The memory 30a stores various types of information used by the controller 30 in performing predetermined processing. Although the memory 30a is contained in the controller 30 in the present embodiment, the memory 30a may be provided outside the controller 30.

A system main relay SMR-B is connected to a positive electrode terminal of the assembled battery 10. The system main relay SMR-B is switched between ON and OFF in response to a control signal from the controller 30. A system main relay SMR-G is connected to a negative electrode terminal of the assembled battery 10. The system main relay SMR-G is switched between ON and OFF in response to a control signal from the controller 30.

A system main relay SMR-P and a limiting resistor 24 are connected in parallel to the system main relay SMR-G. The system main relay SMR-P is switched between ON and OFF in response to a control signal from the controller 30. The limiting resistor 24 is used to prevent an inrush current from flowing in connecting the assembled battery 10 to an inverter 31.

For connecting the assembled battery 10 to the inverter 31, the controller 30 switches the system main relay SMR-B from OFF to ON and switches the system main relay SMR-P from OFF to ON. This causes a current to flow through the limiting resistor 24. Next, the controller 30 switches the system main relay SMR-G from OFF to ON and then switches the system main relay SMR-P from ON to OFF.

The connection between the assembled battery 10 and the inverter 31 is completed in this manner. On the other hand, for disconnecting the assembled battery 10 from the inverter 31, the controller 30 switches the system main relays SMR-B and SMR-G from ON to OFF.

The inverter 31 converts a DC power from the assembled battery 10 into an AC power and outputs the AC power to a motor generator 32. A three-phase AC motor can be used as the motor generator 32. The motor generator 32 receives the AC power from the inverter 31 and generates a kinetic energy for running the vehicle. The kinetic energy generated by the motor generator 32 is transferred to wheels.

For decelerating or stopping the vehicle, the motor generator 32 converts a kinetic energy generated in braking of the vehicle into an electric energy (AC power). The inverter 31 converts the AC power produced by the motor generator 32 into a DC power and outputs the DC power to the assembled battery 10. Thus, the assembled battery 10 can store the regenerative electric power. In the battery system of the present embodiment, a step-up circuit can be provided on a current path connecting the assembled battery 10 to the inverter 31. The step-up circuit can be used to increase the voltage output from the assembled battery 10.

In the battery system of the present embodiment, the controller 30 estimates the amount of precipitation of lithium in the cell 11 and sets an upper limit value of temperature allowable in the cell 11 (referred to as an upper limit temperature) based on the estimated amount of precipitation.

Figure 2:
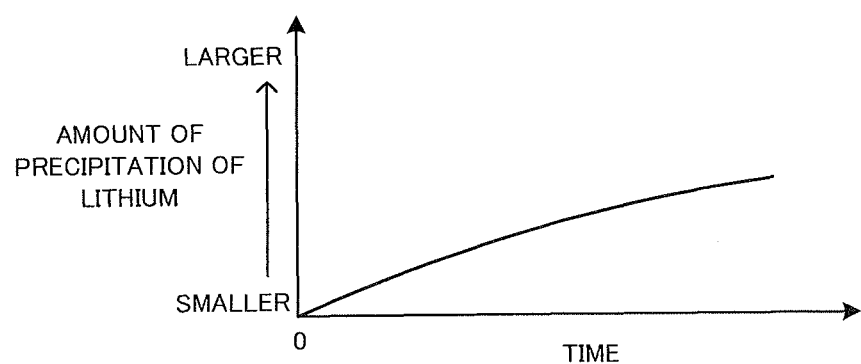
FIG. 2 is a graph showing a change in amount of precipitation of lithium.

As shown in FIG. 2, the amount of precipitation of lithium may be increased over time as the deterioration of the cell 11 proceeds. In FIG. 2, the horizontal axis represents time and the vertical axis represents the amount of precipitation of lithium. The amount of precipitation of lithium is larger toward the top of the vertical axis in FIG. 2. For example, when the cell 11 is overcharged, the lithium may be precipitated to deteriorate the cell 11. The amount of precipitation of lithium can be estimated with a method described later.

Figure 3:
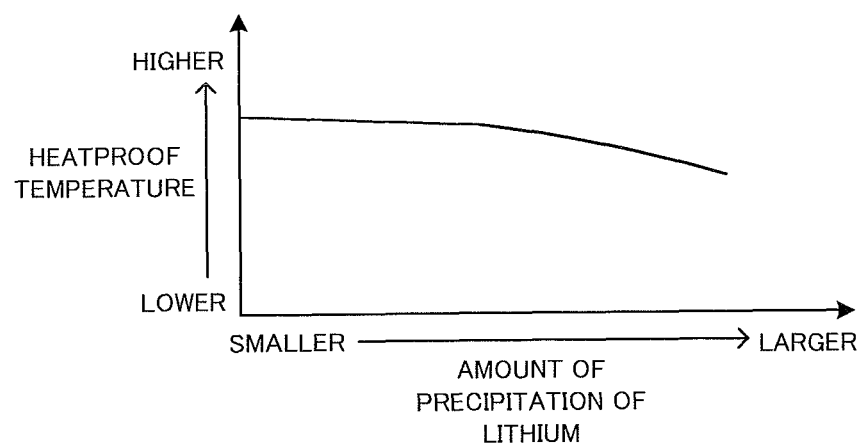
FIG. 3 is a graph showing the relationship between the amount of precipitation of lithium and a heatproof temperature.

As shown in FIG. 3, the precipitation of lithium influences the heatproof temperature of the cell 11. In FIG. 3, the horizontal axis represents the amount of precipitation of lithium, and the amount of precipitation of lithium is larger toward the right of the horizontal axis. In FIG. 3, the vertical axis represents the heatproof temperature of the cell 11, and the heatproof temperature is higher toward the top of the vertical axis. When the temperature of the cell 11 exceeds the heatproof temperature, the production of gas within the cell 11 is accelerated, for example.

As shown in FIG. 3, the heatproof temperature of the cell 11 is reduced as the amount of precipitation of lithium is increased. Thus, the upper limit temperature needs to be reduced as the heatproof temperature of the cell 11 is reduced.

Figure 4:
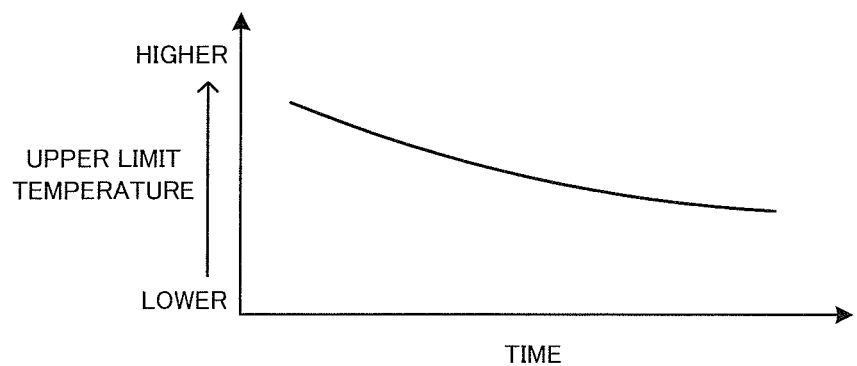
FIG. 4 is a graph showing a change in upper limit temperature.

As shown in FIG. 4, the controller 30 reduces the upper limit temperature over time in the present embodiment. In FIG. 4, the vertical axis represents the upper limit temperature. The upper limit temperature is higher toward the top of the vertical axis. In FIG. 4, the horizontal axis represents time. The change in upper limit temperature shown in FIG. 4 is associated with the amount of precipitation of lithium shown in FIG. 2. Since the amount of precipitation of lithium is increased over time in FIG. 2, the upper limit temperature is reduced over time as shown in FIG. 4.

The association between the amount of precipitation of lithium and the upper limit temperature can be previously determined by carrying out an experiment. Specifically, the relationship between the amount of precipitation of lithium and the heatproof temperature is first determined. The heatproof temperature of the cell 11 is measured with a predetermined amount of lithium precipitated in the cell 11, and the heatproof temperature is repeatedly measured by varying the amount of precipitation of lithium. This can obtain the relationship between the amount of precipitation of lithium and the heatproof temperature. Next, the upper limit temperature can be determined in view of the heatproof temperature. The upper limit temperature can be set at a level lower than the heatproof temperature. If the upper limit temperature is extremely lower than the heatproof temperature, the input/output of the assembled battery 10 may be extremely limited as described later. This fact can be taken into account to determine the difference between the upper limit temperature and the heatproof temperature.

The association between the amount of precipitation of lithium and the upper limit temperature can be previously provided as a map or a calculation expression. The data (map or calculation expression) representing the association between the amount of precipitation of lithium and the upper limit temperature can be stored in the memory 30a. After the estimation of the amount of precipitation of lithium, the controller 30 can use the data representing the association between the amount of precipitation of lithium and the upper limit temperature to specify the upper limit temperature associated with the estimated amount of precipitation of lithium. The controller 30 can control the input/output of the assembled battery 10 based on that upper limit temperature. A method of controlling the input/output of the assembled battery 10 is described later.

Figure 5:
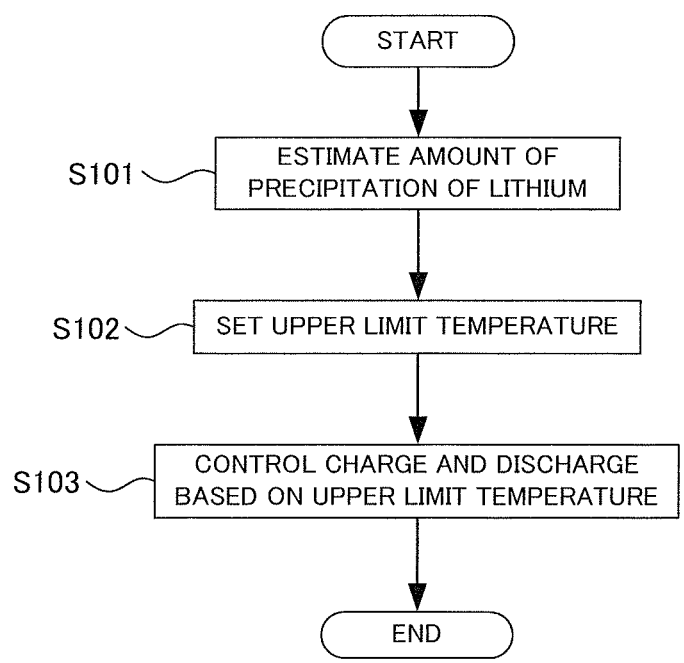
FIG. 5 is a flow chart showing the processing of controlling the charge and discharge of an assembled battery.

Description is now made of the processing of controlling the charge and discharge of the assembled battery 10 in the present embodiment with reference to a flow chart shown in FIG. 5. The processing shown in FIG. 5 is performed by the controller 30.

At step S101, the controller 30 estimates the amount of precipitation of lithium in the cell 11. The method of estimating the amount of precipitation of lithium is described later. At step S102, the controller 30 sets the upper limit temperature based on the amount of precipitation of lithium estimated at step S101. At step S103, the controller 30 controls the input/output of the assembled battery 10 based on the upper limit temperature set at step S102. The method of controlling the input/output of the assembled battery 10 is described later.

Next, the (exemplary) method of estimating the amount of precipitation of lithium is described. The method of estimating the amount of precipitation of lithium is not limited to the method described below. It is only required that the amount of precipitation of lithium should be estimated in order to specify the upper limit temperature from the association between the amount of precipitation of lithium and the upper limit temperature.

The cell 11 is formed of a negative electrode, a separator containing an electrolytic solution, and a positive electrode. A solid electrolyte may be used instead of the separator. Each of the negative electrode and the positive electrode is formed of a collection of active material spheres. During the discharge of the cell 11, a chemical reaction involving release of lithium ions Li+ and electrons e– occurs at an interface of the active material in the negative electrode. On the other hand, at an interface of the active material in the positive electrode, a chemical reaction involving absorption of lithium ions Li+ and electrons e– occurs. During the charge of the cell 11, a reaction reverse to the reaction occurs.

The negative electrode is provided with a collector plate which absorbs the electrons during the discharge of the cell 11. The positive electrode is provided with a collector plate which releases the electrons during the discharge of the cell 11. The collector plate of the negative electrode is made of copper, for example, and is connected to a negative electrode terminal. The collector plate of the positive electrode is made of aluminum, for example, and is connected to a positive electrode terminal. The lithium ions are passed between the positive electrode and the negative electrode through the separator to perform the charge and discharge of the cell 11.

The charge state within the cell 11 depends on the distribution of lithium concentration in the active material of each of the positive electrode and the negative electrode. The lithium contributes to the reactions during the charge and discharge of the cell 11.

The output voltage V (CCV: Closed Circuit Voltage) of the cell 11 is represented by the following expression (1):

$$V = OCV(\theta_1, \theta_2) - R \times I \quad (1)$$

In the expression (1), OCV (Open Circuit Voltage) represents the open circuit voltage of the cell 11, R represents the internal resistance of the cell 11, and I represents the value of a current passing through the cell 11. The resistance R includes a plurality of resistance components. A first resistance component is a purely electrical resistance component for the movements of the electrons in the negative electrode and the positive electrode. A second resistance component is a resistance component which, when a reaction current occurs at the interface of the active material, equivalently acts as an electrical resistance (charge transfer resistance).

$\theta_1$ represents a local SOC (State Of Charge) at the surface of the positive electrode active material. $\theta_2$ represents a local SOC (State Of Charge) at the surface of the negative electrode active material. The resistance R varies with changes in the local SOCs $\theta_1$ and $\theta_2$ and the battery temperature. In other words, the resistance R can be represented as the function of the local SOCs $\theta_1$ and $\theta_2$ and the battery temperature.

The local SOCs $\theta_1$ and $\theta_2$ are represented by the following expression (2):

$$\theta_i = \frac{C_{se,i}}{C_{s,i,max}} \quad (i = 1, 2) \quad (2)$$

In the expression (2), $C_{se,i}$ represents the lithium concentration (average value) at the interface of the positive electrode active material (i=1) or the negative electrode active material (i=2). $C_{s,i,max}$ represents the lithium concentration limit in the positive electrode active material (i=1) or the negative electrode active material (i=2). The lithium concentration limit is the upper limit value of the lithium concentration in the positive electrode or the negative electrode.

Figure 6:
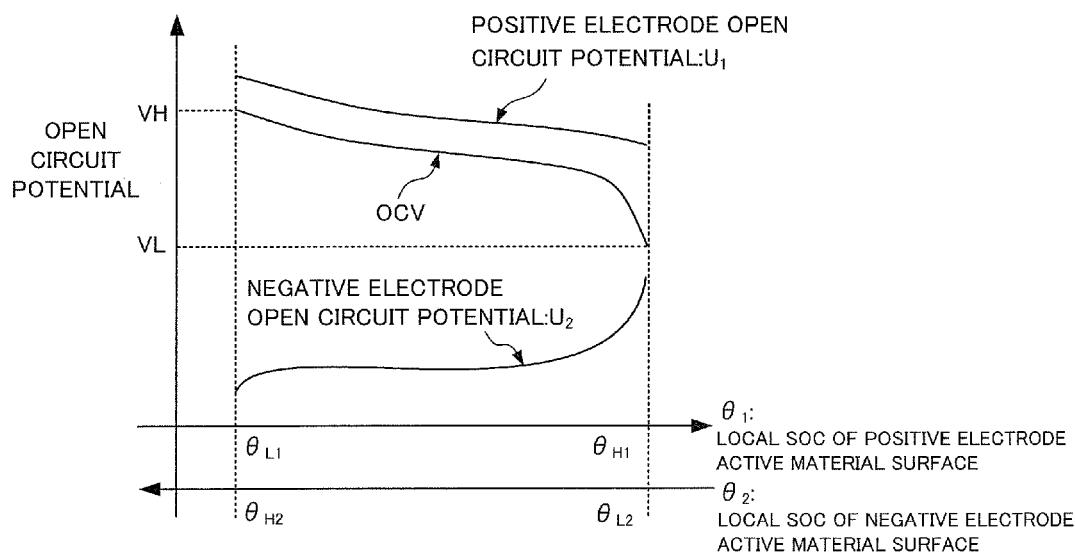
FIG. 6 is a graph showing the characteristics of a change in open circuit voltage with respect to changes in local SOCs.

As shown in FIG. 6, the open circuit voltage OCV of the cell 11 is represented as the potential difference between a positive electrode open circuit potential $U_1$ and a negative electrode open circuit potential $U_2$. The positive electrode open circuit potential $U_1$ varies depending on the local SOC $\theta_1$ at the surface of the positive electrode active material. The negative electrode open circuit potential $U_2$ varies depending on the local SOC $\theta_2$ at the surface of the negative electrode active material.

When the relationship between the local SOC $\theta_1$ and the positive electrode open circuit potential $U_1$ is measured in the initial state of the cell 11, the characteristics representing the relationship between the local SOC $\theta_1$ and the positive electrode open circuit potential $U_1$ (curve $U_1$ shown in FIG. 6) can be obtained. The initial state refers to a state in which the cell 11 is not deteriorated at all, and corresponds to a state immediately after the cell 11 is manufactured, for example.

When the relationship between the local SOC $\theta_2$ and the negative electrode open circuit potential $U_2$ is measured in the initial state of the cell 11, the characteristics representing the relationship between the local SOC $\theta_2$ and the negative electrode open circuit potential $U_2$ (curve $U_2$ shown in FIG. 6) can be obtained. The data representing the curves $U_1$ and $U_2$ can be previously stored as a map in the memory 30a.

The open circuit voltage OCV of the cell 11 is reduced as the discharge proceeds. The deteriorated cell 11 experiences a voltage drop larger than that of the cell 11 in the initial state for the same discharge time. This is because the deterioration of the cell 11 reduces the full charge capacity and changes the characteristics of open circuit voltage OCV. In the present embodiment, the change in characteristics of open circuit voltage OCV due to the deterioration of the cell 11 is modeled as two phenomena presumably occurring within the deteriorated cell 11.

The two phenomena are a reduction in single electrode capacity in the positive electrode and the negative electrode and a composition correspondence mismatch between the positive electrode and the negative electrode.

The reduction in single electrode capacity represents a reduction in ability to receive the lithium in each of the positive electrode and the negative electrode. The reduction in ability to receive the lithium means a reduction in the active material and the like effectively functioning in charge and discharge.

Figure 7:
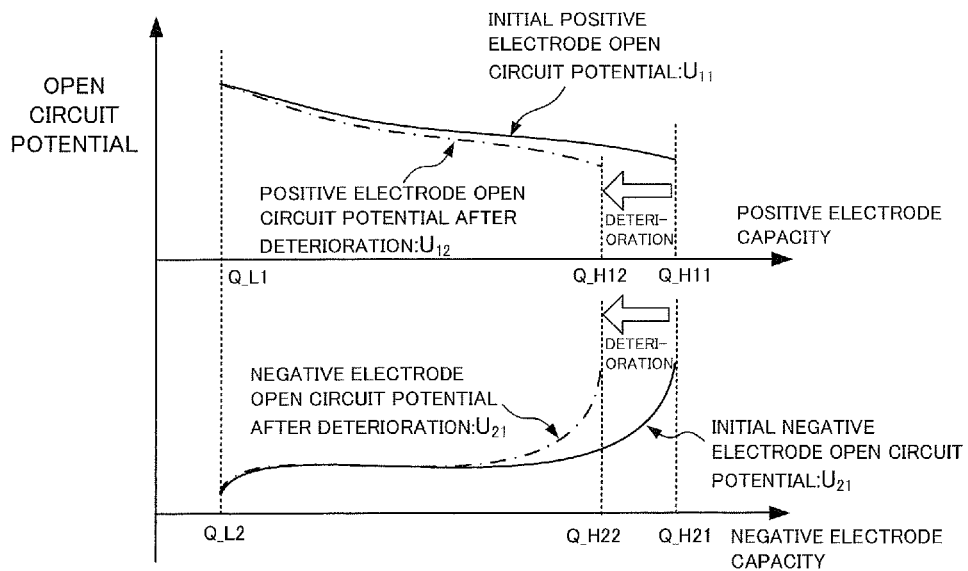
FIG. 7 is a graph showing changes in single electrode open circuit potential with reductions in single electrode capacity.

FIG. 7 schematically shows changes in single electrode open circuit potential due to the reduction in single electrode capacity. In FIG. 7, Q_L1 on the axis of a positive electrode capacity indicates the capacity for the local $SOC\theta_{L1}$ in FIG. 6 in the initial state of the cell 11, and Q_H11 indicates the capacity for the local $SOC\theta_{H1}$ in FIG. 6 in the initial state of the cell 11. Q_L2 on the axis of a negative electrode capacity indicates the capacity for the local $SOC\theta_{L2}$ in FIG. 6 in the initial state of the cell 11, and Q_H21 indicates the capacity for the local $SOC\theta_{H2}$ in FIG. 6 in the initial state of the cell 11.

When the ability to receive the lithium is reduced in the positive electrode, the capacity for the local $SOC\theta_1$ is changed from Q_H11 to Q_H12. When the ability to receive the lithium is reduced in the negative electrode, the capacity for the local $SOC\theta_2$ is changed from Q_H21 to Q_H22.

Even when the cell 11 is deteriorated, the relationship between the local $SOC\theta_1$ and the positive electrode open circuit potential $U_1$ (relationship shown in FIG. 6) is not changed. Thus, the relationship between the local $SOC\theta_1$ and the positive electrode open circuit potential $U_1$ is converted into the relationship between the positive electrode capacity and the positive electrode open circuit potential shown in FIG. 7. The curve representing the relationship between the positive electrode capacity and the positive electrode open circuit potential is shortened from the curve in the initial state of the cell 11 by the deterioration of the cell 11.

The relationship between the local $SOC\theta_2$ and the negative electrode open circuit potential $U_2$ is converted into the relationship between the negative electrode capacity and the negative electrode open circuit potential shown in FIG. 7. The curve representing the relationship between the negative electrode capacity and the negative electrode open circuit potential is shortened from the curve in the initial state of the cell 11 by the deterioration of the cell 11.

Figure 8:
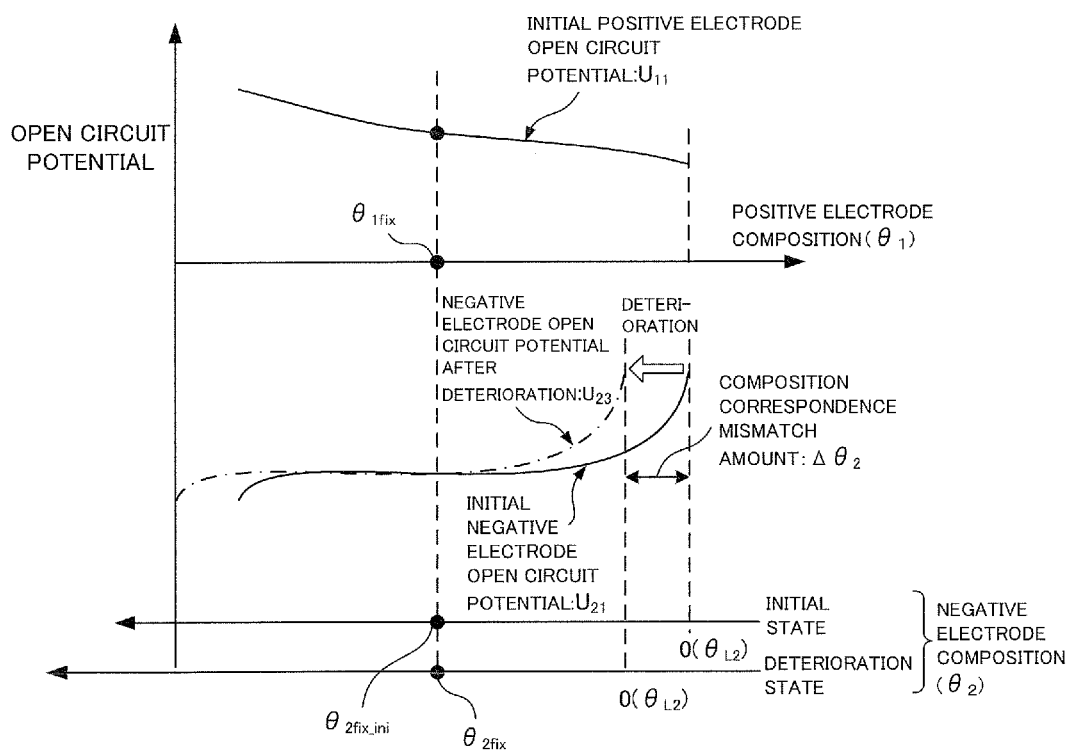
FIG. 8 is a graph for explaining a composition correspondence mismatch between a positive electrode and a negative electrode.

FIG. 8 schematically shows the composition correspondence mismatch between the positive electrode and the negative electrode. The composition correspondence mismatch means a mismatch between a combination of the composition $(\theta_1)$ of the positive electrode and the composition $(\theta_2)$ of the negative electrode in the initial state of the cell 11 and the combination after the charge and discharge are performed using the positive electrode and the negative electrode.

Each of the curves representing the relationships between the compositions $\theta_1$ and $\theta_2$ of the single electrodes and the open circuit potentials $U_1$ and $U_2$ is similar to that shown in FIG. 6. When the cell 11 is deteriorated, the axis of the negative electrode composition $\theta_2$ is shifted by $\Delta\theta_2$ to a lower positive electrode composition $\theta_1$. This causes the curve representing the relationship between the negative electrode composition $\theta_2$ and the negative electrode open circuit potential $U_2$ to be shifted by $\Delta\theta_2$ to a lower positive electrode composition $\theta_1$ relative to the curve in the initial state.

The composition of the negative electrode for the composition $\theta_{1fix}$ of the positive electrode is "$\theta_{2fix\_ini}$" in the initial state of the cell 11, and is "$\theta_{2fix}$" after the deterioration of the cell 11. In FIG. 8, the negative electrode composition $\theta_{L2}$ shown in FIG. 6 is set at zero. When the negative electrode composition $\theta_{L2}$ is zero, all of the lithium in the negative electrode is eliminated.

In the present embodiment, three deterioration parameters are introduced in the battery model to model the two deterioration phenomena described above. The three deterioration parameters include a positive electrode capacity retention rate, a negative electrode capacity retention rate, and a positive/negative electrode composition correspondence mismatch amount. A method of modeling the two deterioration phenomena is described in the following.

The positive electrode capacity retention rate refers to the ratio of the positive electrode capacity in the deterioration state to the positive electrode capacity in the initial state. It is assumed that, when the cell 11 is deteriorated, the positive electrode capacity is reduced by an arbitrary amount from the capacity in the initial state. The positive electrode capacity retention rate $k_1$ is represented by the following expression (3):

$$k_1 = \frac{Q_{1\_ini} - \Delta Q_1}{Q_{1\_ini}} \tag{3}$$

$$(0 < k_1 < 1)$$

In the expression (3), $Q_{1\_ini}$ represents the positive electrode capacity (Q_H11 shown in FIG. 7) when the cell 11 is in the initial state, $\Delta Q_1$ represents the amount of reduction in positive electrode capacity when the cell 11 is deteriorated. The positive electrode capacity $Q_{1\_ini}$ can be previously determined from the theoretical amount and the provided amount of the active material and the like.

The negative electrode capacity retention rate refers to the ratio of the negative electrode capacity in the deterioration state to the negative electrode capacity in the initial state. It is assumed that, when the cell 11 is deteriorated, the negative electrode capacity is reduced by an arbitrary amount from the capacity in the initial state. The negative electrode capacity retention rate $k_2$ is represented by the following expression (4):

$$k_2 = \frac{Q_{2\_ini} - \Delta Q_2}{Q_{2\_ini}} \quad (4)$$

$$(0 < k_2 < 1)$$

In the expression (4), $Q_{2\_ini}$ represents the negative electrode capacity (Q_H21 shown in FIG. 7) when the cell 11 is in the initial state, $\Delta Q_2$ represents the amount of reduction in negative electrode capacity when the cell 11 is deteriorated. The negative electrode capacity $Q_{2\_ini}$ can be previously determined from the theoretical amount and the provided amount of the active material and the like.

Figure 9:
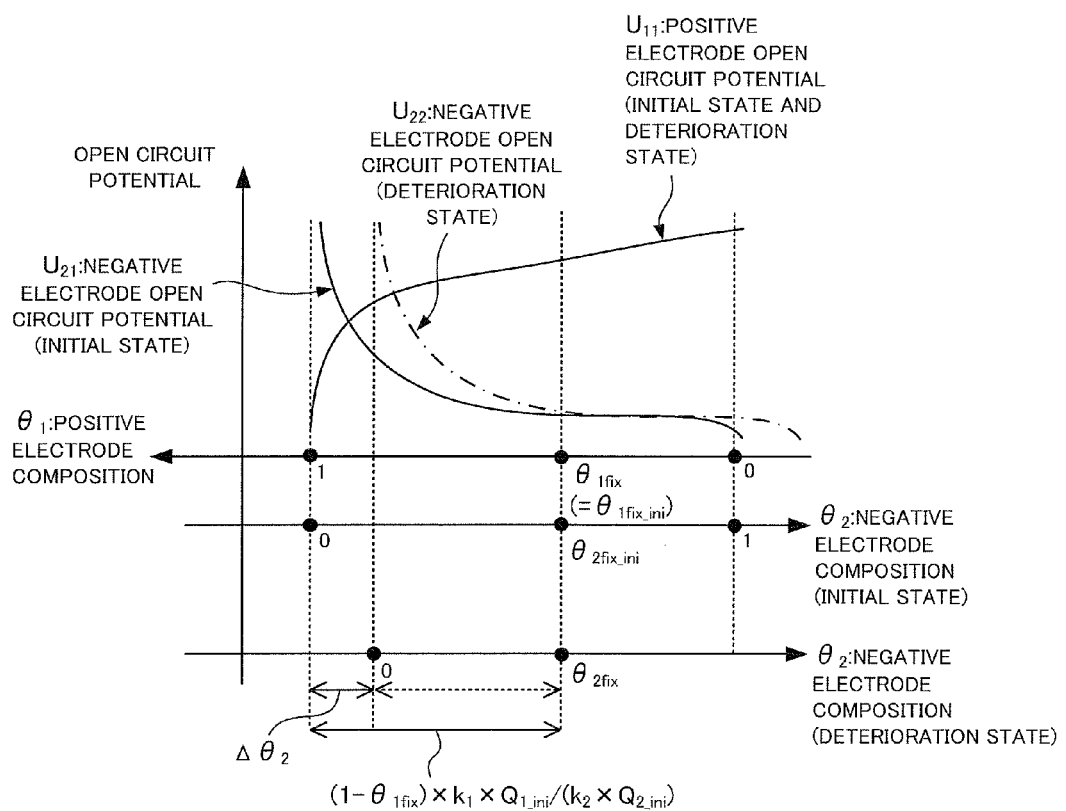
FIG. 9 is a graph for explaining a composition correspondence mismatch due to deterioration.

FIG. 9 is a schematic diagram for explaining the composition correspondence mismatch between the positive electrode and the negative electrode.

Once the cell 11 is deteriorated, the capacity at a negative electrode composition $\theta_2$ of 1 is $(Q_{2\_ini} - \Delta Q_2)$. A composition correspondence mismatch capacity $\Delta Q_S$ between the positive electrode and the negative electrode is a capacity for a mismatch amount $\Delta\theta_2$ of the negative electrode composition axis relative to the positive electrode composition axis. Thus, the relationship shown in the following expression (5) holds:

$$1:\Delta\theta_2 = (Q_{2\_ini} - \Delta Q_2):\Delta Q_s \quad (5)$$

The following expression (6) is derived from the expression (4) and the expression (5):

$$\Delta Q_s = (Q_{2\_ini} - \Delta Q_2) \times \Delta\theta_2 \quad (6)$$
$$= k_2 \times Q_{2\_ini} \times \Delta\theta_2$$

When the cell 11 is in the initial state, the positive electrode composition $\theta_{1fix\_ini}$ corresponds to the negative electrode composition $\theta_{2fix\_ini}$. When the cell 11 is in the deterioration state, the positive electrode composition $\theta_{1fix}$ corresponds to the negative electrode composition $\theta_{2fix}$. The composition correspondence mismatch is defined based on the positive electrode composition $\theta_{1fix}$ in the initial state as the reference. Thus, the positive electrode composition $\theta_{1fix}$ and the positive electrode composition $\theta_{1fix\_ini}$ have the same value.

When the deterioration of the cell 11 produces the composition correspondence mismatch between the positive electrode and the negative electrode, the positive electrode composition $\theta_{1fix}$ and the negative electrode composition $\theta_{2fix}$ after the deterioration of the cell 11 have the relationship represented by the following expressions (7) and (8):

$$\theta_{1fix} = \theta_{1fix\_ini} \quad (7)$$

$$\theta_{2fix} = \frac{(1 - \theta_{1fix}) \times k_1 \times Q_{1\_ini} - \Delta Q_s}{k_2 \times Q_{2\_ini}} \quad (8)$$

Description is now made of the meaning of the expression (8). When the positive electrode composition $\theta_1$ is changed (reduced) from 1 to $\theta_{1fix}$ due to the deterioration of the cell 11, the amount A of lithium released from the positive electrode is represented by the following expression (9):

$$A = (1 - \theta_{1fix}) \times k_1 \times Q_{1\_ini} \quad (9)$$

In the expression (9), the value of $(1 - \theta_{1fix})$ indicates the change in positive electrode composition due to the deterioration of the cell 11. The value of $(k_1 \times Q_{1\_ini})$ indicates the positive electrode capacity after the deterioration of the cell 11.

Assuming that all of the lithium released from the positive electrode is taken into the negative electrode, the negative electrode composition $\theta_{2fix}$ is represented by the following expression (10):

$$\theta_{2fix} = \frac{(1 - \theta_{1fix}) \times k_1 \times Q_{1\_ini}}{k_2 \times Q_{2\_ini}} \quad (10)$$

In the expression (10), the value of $(k_2 \times Q_{2\_ini})$ indicates the negative electrode capacity after the deterioration of the cell 11.

When the composition correspondence mismatch ($\Delta\theta_2$) between the positive electrode and the negative electrode exists, the negative electrode composition $\theta_{2fix}$ is represented by the following expression (11):

$$\theta_{2fix} = \frac{(1 - \theta_{1fix}) \times k_1 \times Q_{1\_ini}}{k_2 \times Q_{2\_ini}} - \Delta\theta_2 \quad (11)$$

As shown in the expression (6), the composition correspondence mismatch amount $\Delta\theta_2$ can be represented by using the composition correspondence mismatch capacity $\Delta Q_S$. Thus, the negative electrode composition $\theta_{2fix}$ is represented by the above expression (8).

As shown in FIG. 9, the open circuit voltage OCV in the deterioration state of the cell 11 is represented as a potential difference between the positive electrode open circuit potential $U_{11}$ and the negative electrode open circuit potential $U_{22}$ in the deterioration state. Once the three deterioration parameters $k_1$, $k_2$, and $\Delta Q_S$ are estimated, the negative electrode open circuit potential $U_{22}$ in the deterioration state of the cell 11 can be specified. Then, the open circuit voltage OCV can be calculated as the potential difference between the negative electrode open circuit potential $U_{22}$ and the positive electrode open circuit potential $U_{11}$.

In the present embodiment, the three deterioration parameters can be used to estimate the precipitation of lithium. The deterioration of the cell 11 includes deterioration due to the precipitation of lithium and deterioration due to wear. The deterioration due to wear refers to the deterioration of the cell 11 except the deterioration due to the precipitation of lithium. The deterioration due to wear involves a reduction in performance of the positive electrode and the negative electrode (ability to receive lithium) resulting from the passage of current, leaving the cell standing for a certain period or the like. The deterioration due to wear includes the wear of the active material in the positive electrode or the negative electrode, for example. In the deterioration due to the precipitation of lithium, the lithium ions used for the battery reaction are changed into by-products (mainly, metallic lithium) and do not contribute to the battery reaction.

The precipitation of lithium may be caused, for example when the lithium ions released from the positive electrode are not taken into the negative electrode in the charge. In this case, the composition correspondence is mismatched between the positive electrode and the negative electrode to change the mismatch capacity $\Delta Q_S$. When only the precipitation of lithium is occurs, the ability to receive lithium is not reduced in the positive electrode and the negative electrode and thus the capacity retention rates $k_1$ and $k_2$ are maintained at 1.

On the other hand, when the deterioration due to wear occurs, all of the three deterioration parameters are shifted from the values in the initial state. Specifically, the capacity retention rates $k_1$ and $k_2$ are changed into values other than 1 and the mismatch capacity $\Delta Q_S$ is changed to a value other than 0.

From this fact, when only the composition correspondence mismatch capacity $\Delta Q_S$ is changed to a value other than 0, it can be assumed that only the deterioration due to the precipitation of lithium occurs within the cell 11. The mismatch capacity $\Delta Q_S$ is changed in accordance with the amount of precipitation of lithium. Once the association between the mismatch capacity $\Delta Q_S$ and the amount of precipitation of lithium is previously determined by an experiment, the amount of precipitation of lithium can be estimated on the basis of the mismatch capacity $\Delta Q_S$.

Figure 10:
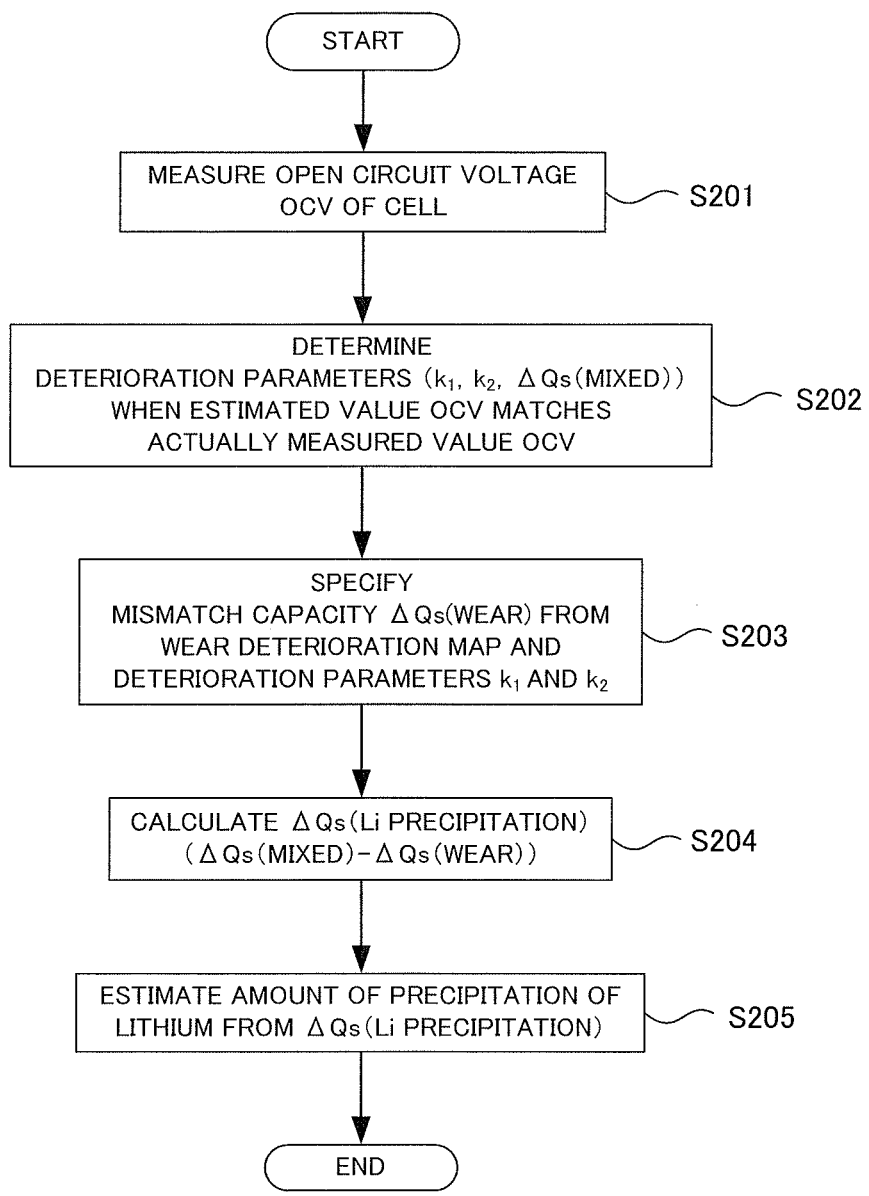
FIG. 10 is a flow chart showing the processing of estimating the amount of precipitation of lithium.

Next, in the present embodiment, description is made of the processing of estimating the amount of precipitation of lithium with reference to a flow chart shown in FIG. 10. The processing shown in FIG. 10 is performed by the controller 30.

At step S201, the controller 30 measures the open circuit voltage (actually measured value) OCV of the cell 11 based on the output from the voltage sensor 21. Since the voltage sensor 21 detects the voltage of the assembled battery 10, the voltage of the assembled battery 10 can be divided by the number of the cells 11 to obtain the open circuit voltage (actually measured value) OCV of the cell 11. If the voltage sensor 21 is placed for each of the cells 11, the controller 30 can obtain the open circuit voltage (actually measured value) OCV of the cell 11 based on the output from the voltage sensor 21.

The open circuit voltage (actually measured value) OCV can be measured while the cell 11 is charged, thereby obtaining the open circuit voltage curve (actually measured value). The open circuit voltage curve refers to a curve representing a change in open circuit voltage with respect to a change in capacity of the cell 11. It is assumed that the deterioration due to the precipitation of lithium and the deterioration due to wear mixedly occur in the cell 11.

When the battery system of the present embodiment is configured to supply the assembled battery 10 with an electric power from an external power source, the measurement of the open circuit voltage (actually measured value) OCV during the charge of the cell 11 is facilitated. The external power source refers to a power source provided independently of the battery system. A commercial power source can be used as the external power source, for example. In supplying the electric power from the external power source to the assembled battery 10, a charger can be added to the battery system of the present embodiment. When the external power source supplies an AC power, the charger converts the AC power from the external power source into a DC power and supplies the DC power to the assembled battery 10.

At step S202, while the controller 30 appropriately changes the three deterioration parameters (capacity retention rates $k_1$ and $k_2$ and mismatch capacity $\Delta Q_S$), the controller 30 determines whether or not the open circuit voltage (estimated value) OCV specified by the three deterioration parameters matches the open circuit voltage (actually measured value) OCV obtained at step S201.

Figures 11, 12:
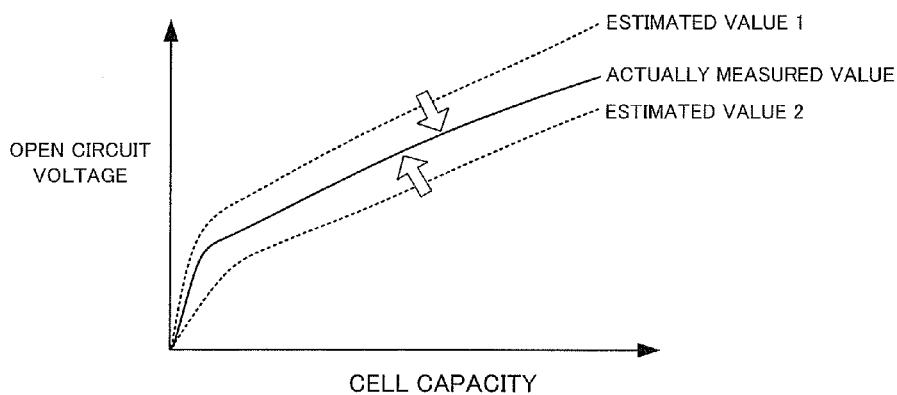
FIG. 11 is a graph showing the relationship between a battery capacity and an open circuit voltage.
FIG. 12 is a map showing the relationship between a positive electrode capacity retention rate, a negative electrode capacity retention rate, and a composition correspondence mismatch capacity when only wear deterioration is produced.

Specifically, the controller 30 sets an arbitrary combination of the three deterioration parameters and calculates the open circuit voltage (estimated value) OCV based on the set deterioration parameters. FIG. 11 shows the relationship between the open circuit voltages (estimated values) OCV and the open circuit voltage (actually measured value) OCV. In FIG. 11, the open circuit voltages (estimated values) OCV are shown by dotted lines and the open circuit voltage (actually measured value) OCV is shown by a solid line.

In FIG. 11, when the open circuit voltage curve of an estimated value 1 is provided, the open circuit voltage (estimated value) OCV is higher than the open circuit voltage (actually measured value) OCV. In this case, the controller 30 sets the deterioration parameters again such that the curve approaches the open circuit voltage curve of the actually measured value. When the open circuit voltage value of an estimated value 2 is obtained, the open circuit voltage (estimated value) OCV is lower than the open circuit voltage (actually measured value) OCV. In this case, the controller 30 sets the deterioration parameters again such that the curve approaches the open circuit voltage curve of the actually measured value.

The controller 30 repeatedly sets the deterioration parameters to match the open circuit voltage (estimated value) OCV with the open circuit voltage (actually measured value) OCV. A range (tolerance) can be set in which the open circuit voltage (estimated value) OCV can be regarded as matching the open circuit voltage (actually measured value) OCV even when they do not precisely match.

The controller 30 specifies the deterioration parameters obtained when the open circuit voltage (estimated value) OCV is matched with the open circuit voltage (actually measured value) OCV. The specified mismatch capacity $\Delta Q_S$ is the mismatch capacity $\Delta Q_S$ (mixed) found when the deterioration due to the precipitation of lithium and the deterioration due to wear mixedly occur.

At step S203, the controller 30 specifies the mismatch capacity $\Delta Q_s$ (wear) caused only by wear deterioration. A map (wear deterioration map) shown in FIG. 12 can be previously provided to specify the mismatch capacity $\Delta Q_s$ (wear) from the capacity retention rates $k_1$ and $k_2$ specified at step S202. The wear deterioration map shown in FIG. 12 can be obtained by calculating the capacity retention rates and the mismatch capacity $\Delta Q_s$ with the method described at step S202 for the cell 11 in which only the wear deterioration is produced. By maintaining the cell 11 at a high temperature, the precipitation of lithium can be suppressed to produce only the deterioration due to wear. The temperature used in maintaining the cell 11 at a high temperature is set at 50° C., for example.

The capacity retention rates $k_1$ and $k_2$ are not changed only by the deterioration due to the precipitation of lithium but changed when the wear deterioration occurs. It is thus seen that, when the capacity retention rates $k_1$ and $k_2$ obtained at step S202 are lower than 1, those capacity retention rates $k_1$ and $k_2$ result from the wear deterioration. Since the wear deterioration map represents the association between the capacity retention rates $k_1$ and $k_2$ and the mismatch capacity $\Delta Q_S$ when only the wear deterioration occurs, the mismatch capacity $\Delta Q_S$ (wear) can be specified once the capacity retention rates $k_1$ and $k_2$ are found.

At step S204, the controller 30 determines a difference between the mismatch capacity $\Delta Q_S$ (mixed) obtained at step S202 and the mismatch capacity $\Delta Q_S$ (wear) obtained at step S203. The difference serves as the mismatch capacity $\Delta Q_S$ (Li precipitation) caused by the deterioration due to the precipitation of lithium.

At step S205, the controller 30 specifies the amount of precipitation of lithium from the mismatch capacity $\Delta Q_S$ (Li precipitation) obtained at step S204. By previously determining the association between the mismatch capacity $\Delta Q_S$ (Li precipitation) and the amount of precipitation of lithium, the association can be used to specify the amount of precipitation of lithium.

Figure 13:
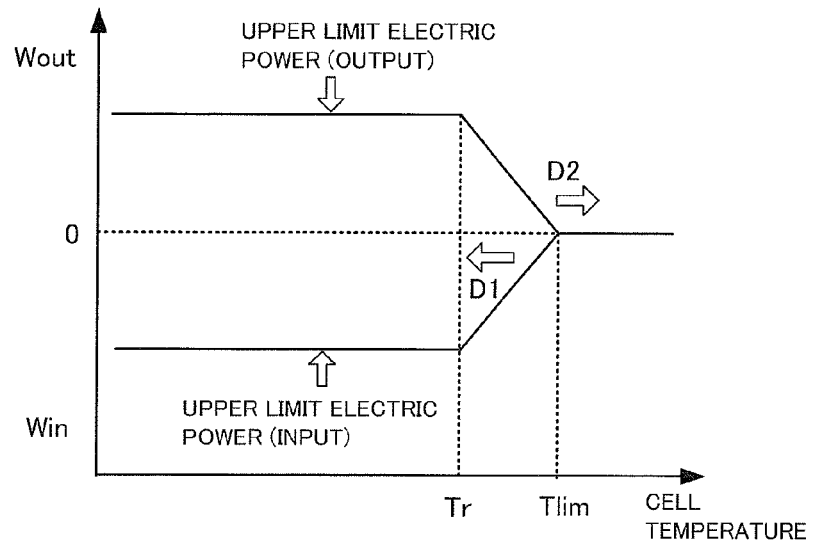
FIG. 13 is a graph showing the relationship between a battery temperature and an upper limit electric power.

Next, description is made of the method of controlling the input/output (charge/discharge) of the assembled battery 10 based on the upper limit temperature with reference to FIG. 13. In controlling the input/output of the assembled battery 10, the upper limit electric power is set based on the upper limit temperature. The upper limit electric power refers to the upper limit value of electric power to which the input/output of the assembled battery 10 is allowed.

FIG. 13 shows the relationship between the temperature of the assembled battery 10 (cell 11) and the upper limit electric power for the input/output of the assembled battery 10. The upper limit electric power is provided for each of the input and the output of the assembled battery 10. In FIG. 13, the vertical axis represents the electric power of the input/output, and the electric power is higher toward the top or bottom away from zero. In FIG. 13, the horizontal axis represents the temperature of the assembled battery 10, and the temperature is higher toward the right.

When the upper limit temperature is set at a temperature Tlim, and the temperature of the cell 11 reaches the upper limit temperature Tlim, the controller 30 sets the upper limit electric power of the input/output at 0 kW. This can eliminate the input/output of the assembled battery 10 to suppress heat generation in the cell 11 due to the charge and discharge of the assembled battery 10. The suppression of the heat generation in the cell 11 can prevent the temperature of the cell 11 from exceeding the upper limit temperature Tlim.

The upper limit electric power can be lowered as the temperature of the cell 11 becomes closer to the upper limit temperature Tlim. In the example shown in FIG. 13, the upper limit electric power is lowered when the temperature of the cell 11 is equal to or higher than a temperature Tr. The temperature Tr is a temperature lower than the upper limit temperature Tlim. A change rate at which the upper limit electric power is lowered can be set as appropriate. The change rate is the rate of change in upper limit electric power relative to change in temperature, and indicates the slope of the upper limit electric power within the range from the temperature Tr to the upper limit temperature Tlim. The upper limit electric power is not limited in the temperature range lower than the temperature Tr.

When the upper limit temperature is set at a temperature lower than the temperature Tlim, the line of the upper limit electric power may be shifted in a direction indicated by an arrow D1 in FIG. 13. When the upper limit temperature is set at a temperature higher than the temperature Tlim, the line of the upper limit electric power may be shifted in a direction indicated by an arrow D2 in FIG. 13.

Although the upper limit electric power for the input of the assembled battery 10 is changed with respect to the temperature change in the same manner as that for the output of the assembled battery 10 in FIG. 13, the present invention is not limited thereto. Specifically, the upper limit electric power in the input of the assembled battery 10 and the upper limit electric power in the output of the assembled battery 10 can behave differently from each other.

Once the upper limit electric power in the input/output of the assembled battery 10 is determined, the controller 30 controls the output from the assembled battery 10 such that the electric power output from the assembled battery 10 does not exceed the upper limit electric power (for output). Specifically, the controller 30 changes the electric power output from the assembled battery 10 within the range lower than the upper limit electric power. The controller 30 also controls the input of the assembled battery 10 such that the electric power input to the assembled battery 10 does not exceed the upper limit electric power (for input). Specifically, the controller 30 changes the electric power input to the assembled battery 10 within the range lower than the upper limit electric power.

Figure 14:
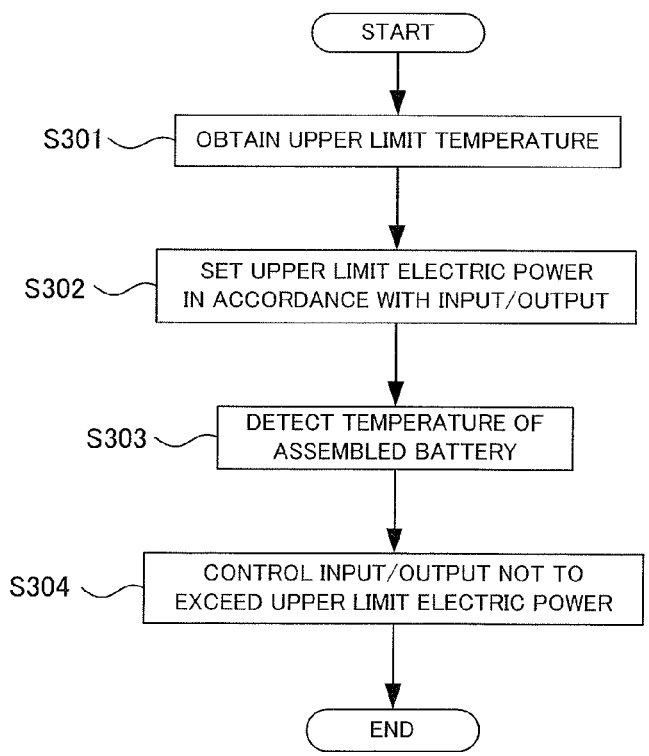
FIG. 14 is a flow chart showing the processing of controlling the charge and discharge of the assembled battery.

Description is now made of a method of controlling the charge and discharge of the assembled battery 10 with reference to a flow chart shown in FIG. 14. The processing shown in FIG. 14 is performed by the controller 30.

At step S301, the controller 30 obtains the upper limit temperature set in accordance with the amount of precipitation of lithium. At step S302, the controller 30 determines the upper limit electric power of the input/output based on the upper limit temperature. At step S303, the controller 30 obtains the temperature of the assembled battery 10 based on the output from the temperature sensor 23. At step S304, the controller 30 controls the charge and discharge of the assembled battery 10 based on the upper limit electric power associated with the temperature obtained at step S303. Specifically, the controller 30 controls the charge and discharge of the assembled battery 10 such that the electric power in the input/output of the assembled battery 10 does not exceed the upper limit electric power.

The invention claimed is:

1. A control apparatus controlling charge and discharge of a lithium-ion secondary battery, comprising:
   a temperature sensor obtaining a temperature of the lithium-ion secondary battery; and
   a controller controlling the charge and discharge of the lithium-ion secondary battery to maintain the temperature obtained by the temperature sensor at a level lower than an upper limit temperature allowed in the lithium-ion secondary battery,
   wherein the controller specifies a part of a deterioration of the lithium-ion secondary battery as a deterioration due to precipitation of lithium by using a deterioration parameter defining the deterioration of the lithium-ion secondary battery to estimate an amount of precipitation of lithium in the lithium-ion secondary battery and reduces the upper limit temperature in accordance with an increase in the amount of precipitation.

2. The control apparatus according to claim 1, wherein the controller uses information representing an association between the amount of precipitation and the upper limit temperature to specify the upper limiter temperature associated with the estimated amount of precipitation.

3. The control apparatus according to claim 2, wherein the controller sets an upper limit electric power based on the upper limit temperature, the charge and discharge of the lithium-ion secondary battery being allowed to the upper limit electric power.

4. The control apparatus according to claim 1, wherein the controller sets an upper limit electric power based on the upper limit temperature, the charge and discharge of the lithium-ion secondary battery being allowed to the upper limit electric power.

5. The control apparatus according to claim 4, wherein the controller performs the charge and discharge of the lithium-ion secondary battery with an electric power lower than the upper limit electric power.

6. The control apparatus according to claim 1, wherein a heatproof temperature of the lithium-ion secondary battery is reduced in accordance with the increase in the amount of precipitation.

7. The control apparatus according to claim 1, wherein the deterioration of the lithium-ion secondary battery includes a deterioration due to wear and the deterioration due to the precipitation of the lithium,
the controller specifies the deterioration due to the precipitation of the lithium by omitting the deterioration due to the wear from the deterioration of the lithium-ion secondary battery.

8. The control apparatus according to claim 1, wherein the deterioration of the lithium-ion secondary battery is sum of a deterioration due to wear and the deterioration due to the precipitation of lithium,
the controller specifies the deterioration due to the precipitation of the lithium by omitting the deterioration due to the wear from the deterioration of the lithium-ion secondary battery.

9. A control method for controlling charge and discharge of a lithium-ion secondary battery, comprising:
obtaining a temperature of the lithium-ion secondary battery;
controlling the charge and discharge of the lithium-ion secondary battery to maintain the obtained temperature at a level lower than an upper limit temperature allowed in the lithium-ion secondary battery;
specifying a part of a deterioration of the lithium-ion secondary battery as a deterioration due to precipitation of lithium by using a deterioration parameter defining the deterioration of the lithium-ion secondary battery;
estimating an amount of precipitation of lithium in the lithium-ion secondary battery and reducing the upper limit temperature in accordance with an increase in the amount of precipitation.

10. The control method according to claim 9, wherein information representing an association between the amount of precipitation and the upper limit temperature is used to specify the upper limiter temperature associated with the estimated amount of precipitation.

11. The control method according to claim 10, wherein an upper limit electric power is set on the basis of the upper limit temperature, the charge and discharge of the lithium-ion secondary battery being allowed to the upper limit electric power.

12. The control method according to claim 9, wherein an upper limit electric power is set on the basis of the upper limit temperature, the charge and discharge of the lithium-ion secondary battery being allowed to the upper limit electric power.

13. The control method according to claim 12, wherein the charge and discharge of the lithium-ion secondary battery are performed with an electric power lower than the upper limit electric power.

14. The control method according to claim 9, wherein a heatproof temperature of the lithium-ion secondary battery is reduced in accordance with the increase in the amount of precipitation.

15. The control method according to claim 9, wherein the deterioration of the lithium-ion secondary battery includes a deterioration due to wear and the deterioration due to the precipitation of the lithium,
the deterioration due to the precipitation of the lithium is specified by omitting the deterioration due to the wear from the deterioration of the lithium-ion secondary battery.

16. The control method according to claim 9, wherein the deterioration of the lithium-ion secondary battery is sum of a deterioration due to wear and the deterioration due to the precipitation of lithium,
the deterioration due to the precipitation of the lithium is specified by omitting the deterioration due to the wear from the deterioration of the lithium-ion secondary battery.

* * * * *